US012058001B2

(12) United States Patent
Iwahashi et al.

(10) Patent No.: US 12,058,001 B2
(45) Date of Patent: Aug. 6, 2024

(54) CONTROL DEVICE, CONTROL METHOD, CONTROL PROGRAM AND CONTROL SYSTEM

(71) Applicant: Nippon Telegraph and Telephone Corporation, Tokyo (JP)

(72) Inventors: Hiroki Iwahashi, Musashino (JP); Masato Nishiguchi, Musashino (JP); Takahiro Shibata, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/023,795

(22) PCT Filed: Aug. 31, 2020

(86) PCT No.: PCT/JP2020/032959
§ 371 (c)(1),
(2) Date: Feb. 28, 2023

(87) PCT Pub. No.: WO2022/044341
PCT Pub. Date: Mar. 3, 2022

(65) Prior Publication Data
US 2023/0246911 A1    Aug. 3, 2023

(51) Int. Cl.
*H04L 41/0823* (2022.01)
(52) U.S. Cl.
CPC ................ *H04L 41/0823* (2013.01)
(58) Field of Classification Search
CPC .................................. H04L 41/0823
See application file for complete search history.

(56) References Cited

U.S. PATENT DOCUMENTS

| 2015/0149611 A1* | 5/2015 | Lissack ................... H04L 41/12 709/224 |
| 2015/0365353 A1 | 12/2015 | Nagase |
| 2019/0104539 A1* | 4/2019 | Park ..................... H04W 72/23 |
| 2021/0075853 A1* | 3/2021 | Banerjee ............. G06F 9/45558 |

FOREIGN PATENT DOCUMENTS

| JP | 2015156566 | 8/2015 |
| JP | 20165008 | 1/2016 |
| JP | 2019148843 | 9/2019 |

OTHER PUBLICATIONS

Iwahashi et al., "Consideration of Flexible User Accommodation on Edge Router," The Institute of Electronics, Information and Communication Engineers 2020 Society Conference, Mar. 3, 2020, 3 pages (with English Translation).

\* cited by examiner

*Primary Examiner* — Philip C Lee
(74) *Attorney, Agent, or Firm* — Fish & Richardson P.C.

(57) ABSTRACT

An external system linkage unit (11) receives control information of a plurality of communication devices (21 to 29) accommodating a user using a network from an external system. A resource collection unit (12) acquires resource information of each of the communication devices (21 to 29) and detects a change in resource state. A device management unit (14) executes control of the communication device (21 to 29) including recombination of an accommodation position of the user on the basis of the control information received by the external system linkage unit (11) or the change of the resource state detected by the resource collection unit (12).

17 Claims, 8 Drawing Sheets

CONTROL DEVICE, CONTROL METHOD, CONTROL PROGRAM AND CONTROL SYSTEM

CROSS-REFERENCE TO RELATED APPLICATIONS

This application is a National Stage application under 35 U.S.C. § 371 of International Application No. PCT/JP2020/032959, having an International Filing Date of Aug. 31, 2020.

The disclosure of the prior application is considered part of the disclosure of this application, and is incorporated by reference in its entirety into this application.

TECHNICAL FIELD

The present invention relates to a management device, a management method, a management program, and a management system.

BACKGROUND ART

Conventionally, there has been a technique for appropriately selecting a communication device accommodating a user in accordance with an idle resource of each communication equipment by unitarily collecting and managing resources such as a band of the communication device constituting a network, a number of filters that can be set, and a number of sessions that can be established. Thus, flexible user accommodation is enabled while maintaining the communication quality of the user constant. Setting to the communication device selected by the user to be accommodated is performed by registering setting information of user configuration in each communication device.

The backup of the user configuration is set in advance in the other communication device, and when the specific communication device fails, the communication device to be accommodated in the other communication device holding the backup of the user configuration registered in the specific communication device is switched. Thus, the communication device accommodating the user is immediately switched, and the continuity of communication is maintained.

Further, when a new user is accommodated or resource information is collected, the resource state of each communication device is confirmed at any time. When the resource state of each communication device is largely changed due to a failure of the communication device or a rapid increase in user communication, the communication device accommodating the user is changed or the backup position of the user configuration is changed. Thus, resource shortage can be prevented, and communication quality of user communication can be maintained constant. In the following, a communication device accommodating the user may be referred to as an accommodation device of the user. Further, the communication device to which the user is accommodated may be referred to as an accommodation position of the user. In addition, switching of the accommodation device of the user may be referred to as recombination of the accommodation device.

In the conventional recombination processing of the accommodation device, the function unit is divided for each processing unit, and each function unit autonomously acquires database information in which processing contents are registered. Then, each function unit executes processing corresponding to the status of each input request included in the acquired database information, and inputs the processing result to the database. In this method, it is not necessary to specify the linkage operation of each function unit, and development and modification of the function unit are easy as compared with a method in which each function unit instructs the processing of the next function unit. Also, in this method, even if a fault occurs in the functional unit in the middle of the processing flow, another functional unit having the same function or another redundant functional unit can take over the processing. Further, since processing logic such as determination of the accommodation position of the user is individually managed as a scenario, processing under execution and external information can be linked to each other at the time of executing the recombination processing of the accommodation equipment.

CITATION LIST

Non Patent Literature

[NPL 1] Hiroki Iwahashi, and three others, "A study of flexible user accommodation method in edge routers", IEICE, general conference 2020, B-6-58, March 2020

SUMMARY OF INVENTION

Technical Problem

However, in the prior art, one centralized management server performs collection of resource information, detection of a change in resource status, and user accommodation recombination processing after the detection of the change in resource status. In the configuration in which the centralized management server performs each process in a centralized manner, a very high performance requirement is required for the centralized management server in order to deal with a large amount of requests. In particular, in order to perform the recombination of the accommodation devices corresponding to the resources to be converted from moment to moment such as the communication amount of a user, it is desirable to always monitor the communication device, and it is considered that a processing load becomes higher, and a higher performance requirement is required for the centralized management server. Further, in order to take over each input request when each function unit fails, the function unit of the active system and the function unit of the redundant system always share the processing state, and it is difficult to change by adding the model of the communication device, adding the service, and the like. In addition, each function unit executes the recombination processing of the accommodation device according to the scenario, but it is difficult to perform control based on information other than resource situations other than those registered in the scenario. For example, it is difficult to perform control such as checking communication contents and automatically blocking an attack packet or the like.

Solution to Problem

In order to solve the above problem and achieve the purpose, an external system linkage unit receives control information of a plurality of communication devices accommodating users using a network from an external system. A resource collection unit acquires resource information of each of the communication devices and detects a change in a resource state. A device management unit executes control of the communication device including recombination of the accommodation position of the user on the basis of the control information received by the external system linkage unit or a change in the resource state detected by the resource collection unit.

Advantageous Effects of Invention

According to the present invention, communication control can be flexibly performed while securing performance of the recombination processing of the accommodation equipment.

DESCRIPTION OF EMBODIMENTS

Hereinafter, the example of a management device, a management method, a management program, and a management system according to the present application will be described in detail with reference to the drawings. It should be noted that this example does not limit the generation device, the generation method, and the generation program according to the disclosure of the present application.

Configuration of First Embodiment

Figure 1:
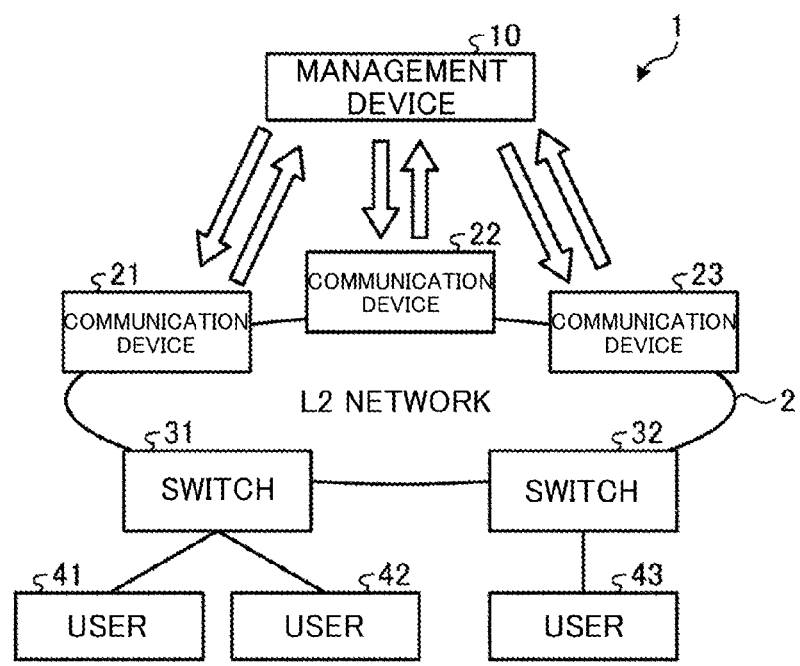
FIG. 1 is a diagram showing a configuration example of a management system.

First, the configuration of the management system according to the first embodiment will be described using FIG. 1. FIG. 1 is a diagram showing a configuration example of the management system. As shown in FIG. 1, the management system 1 includes a management device 10, a communication device 21, a communication device 22, and a communication device 23. Each of the communication devices 21 to 23 accommodates a user through switches 31 and 32 on the L (Layer) 2 network 2. The communication devices 21 to 23, for example, are routers, SSEs (Subscriber Service Edge), and the like. The management device 10 is, for example, a server capable of controlling the communication device.

It is assumed that the user 41, the user 42 and the user 43 are actually a network, a terminal or the like used by the user. The switch 31 is connected to the user 41 and the user 42. In addition, the switch 32 is connected to the user 43.

Figure 2:
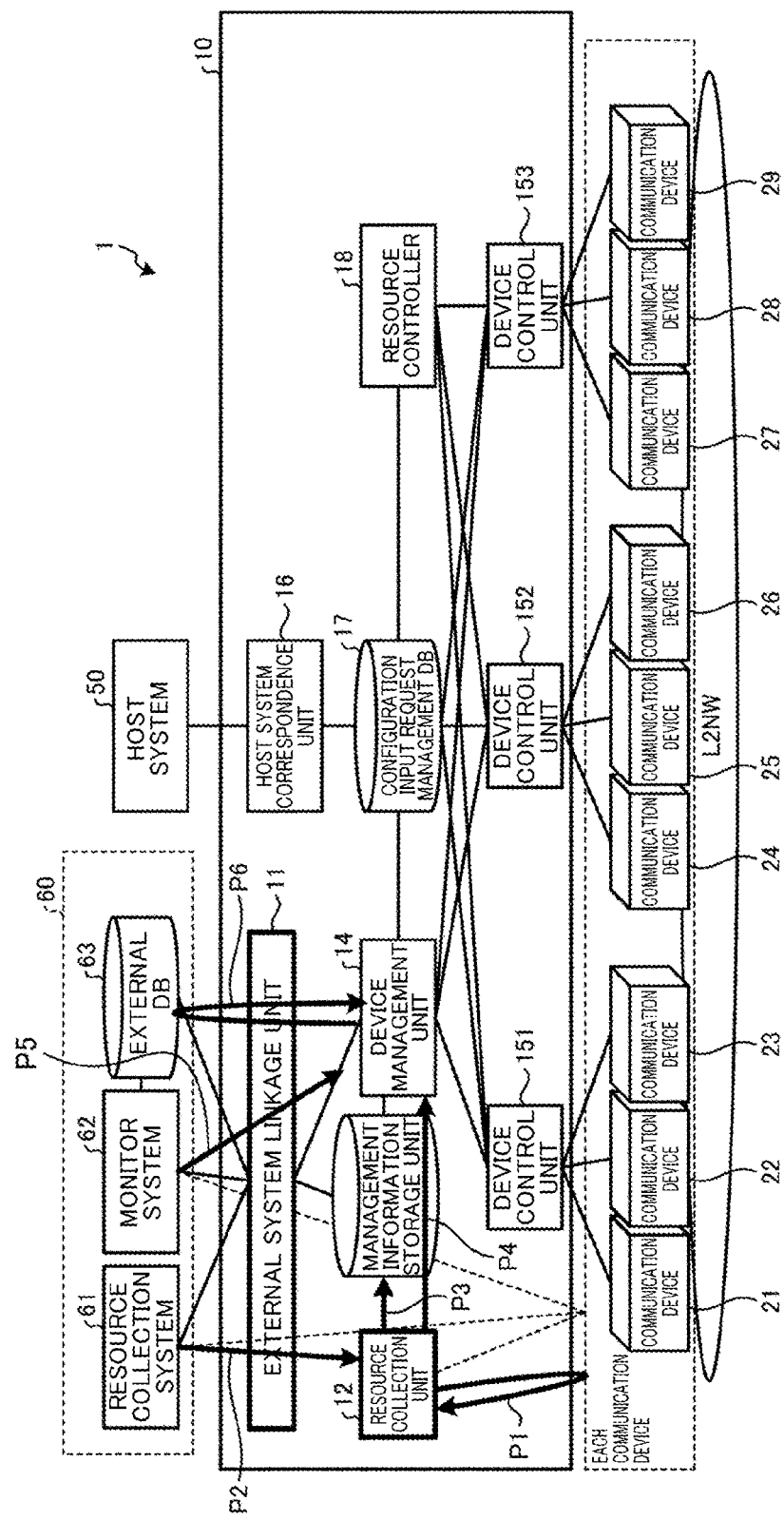
FIG. 2 is a diagram showing a configuration example of a management system in detail.

First, a configuration of the management system 1 will be explained in detail with reference to FIG. 2. FIG. 2 is a diagram showing a configuration example of the management system.

As shown in FIG. 2, the management system 1 includes the management device 10 and the communication devices 21 to 29. In the following description, when the communication devices 21 and 29 are not distinguished from each other, they are called "communication device 20". The communication device 20 is a switch, a router, or the like, and accommodates the user who uses the communication service. The management device 10 is connected to the communication device 20, the host system 50, and the external system 60.

The host system 50 transmits a request for configuration input to the management device 10. The function of the host system 50 may be realized by an operator. In this case, the operator inputs the contents of the configuration input request to the management device 10. The configuration input is to set a user configuration to the communication device 20 accommodating the user, and to perform setting associated with opening, change, cancellation or the like of a service.

The external system 60 includes, for example, a resource collection system 61, a monitor system 62, an external DB 63, and the like. The resource collection system 61 is a system for always monitoring each communication device 20 and collecting information on each resource. The monitor system 62 monitors the operation of the communication device 20 and collects information other than the information on the resources. For example, the monitor system 62 monitors communication contents and the like in the communication device 20. The external DB 63 is a database for storing information on each communication device 20 collected by the monitor system 62.

The management device 10 includes an external system linkage unit 11, a resource collection unit 12, a management information storage unit 13, a device management unit 14, a host system correspondence unit 16, a configuration input request management DB 17, a resource controller 18, and device control units 151 to 153. Since the device control units 151 to 153 have the same functions, they are called "device control unit 150" when they are not distinguished from each other in the following description.

The management device 10 may be implemented by a plurality of computers, or may be implemented by one computer. That is, the external system linkage unit 11, the resource collection unit 12, the management information storage unit 13, the device management unit 14, the host system correspondence unit 16, the configuration input request management DB 17, the resource controller 18, and the device control unit 150 is realized by one or more physical machines or virtual machines, respectively. In FIG. 2, the management device 10 is connected to the communication devices 21 to 29 allocated to the device control unit 150.

The host system correspondence unit 16 receives the configuration input request from the host system 51. The host system correspondence unit 16 registers the received configuration input request in the configuration input request management DB 17.

The configuration input request management DB 17 receives registration of the configuration input request by the host system correspondence unit 16. Thus, the configuration input request management DB 17 stores the request content of configuration input to a plurality of communication devices 20 accommodating the users using the network. In the configuration input request management DB 17, information for identifying the communication device 20 determined as a configuration input destination corresponding to the request content of the configuration input request is stored by the accommodation management unit 142.

The resource controller 18 monitors the operation state of each function unit including each device control unit 150, and controls the operation of each function unit according to the state. The resource controller 18 adjusts the priority of resources or tasks allocated to the respective function units.

The resource controller 18 monitors the number of input requests received by the configuration input request management DB 17 at every fixed time, and performs resource allocation of the device control unit 150 according to the number, and change the confirmation frequency of the configuration input request management DB 17 in periodic monitoring. Specifically, the resource controller 205 performs scale-up, allocation of computer resources, DB confirmation frequency change, and the like in accordance with the number of input requests.

For example, when a large amount of configuration input requests to the communication device 20 are in a state of waiting for processing in the configuration input request management DB 17, resources of the device control unit 150 may become insufficient. In such a case, the resource controller 18 temporarily adds the device control unit 150, and allocates the communication device 20 to the added device control unit 150. The resource controller 18 may be extended by automatically generating a virtual machine on a predetermined server. Further, the resource controller 18 may perform control only to the device control unit 150 requiring acceleration of the confirmation frequency among the plurality of device control units 150. Thus, the resource controller 18 prevents an access resource of the configuration input request management DB 17 from being exhausted because the access frequency of the device control unit 150 to the configuration input request management DB 17 is high.

Further, the resource controller 18 can make the device control unit 150 process the configuration input based on a request content whose residence time is equal to or longer than a fixed time in unprocessed request contents stored in the configuration input request management DB 17 preferentially. First, the resource controller 18 confirms whether there is the input request in a staying state which has not been processed for the predetermined time or longer. Then, the resource controller 18 sets the priority of the input request during the residence to be high. Thus, the resource controller 18 prevents the accumulation of the input request.

The external system linkage unit 11, the resource collection unit 12, the management information storage unit 13, and the device management unit 14 performs accommodation management processing and performs general control processing of the communication device 20 other than the accommodation management processing based on the resource state of each communication device 20 such as determination of the accommodation device of each user and recombination of the accommodation device. The general control processing includes, for example, control processing of the communication device 20 based on information other than a resource state such as automatically blocking the communication by the communication device 20 when a communication by virus infection, an attack packet, or the like is detected in the communication of the communication device 20. In addition, the general control processing may include a new control processing based on the resource state other than the accommodation management processing.

Figure 3:
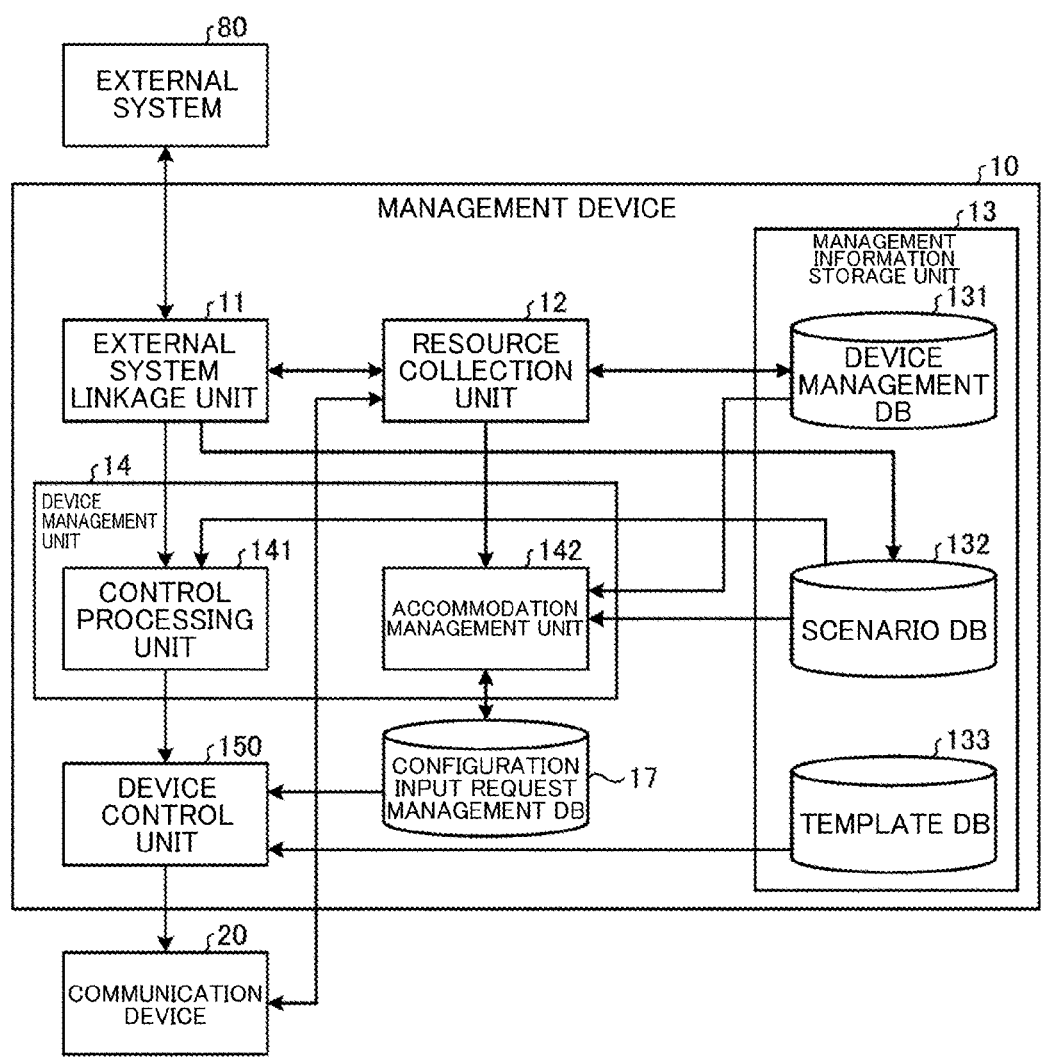
FIG. 3 is a block diagram relating to functions for performing accommodation management processing and general management processing in the management device.

Referring to FIG. 3, the details of the external system linkage unit 11, the resource collection unit 12, the management information storage unit 13, and the device management unit 14 will be described. FIG. 3 is the block diagram showing the functions of the management device for performing the accommodation management processing and the general management processing. FIG. 3 shows the functions of the management device 10 for performing the accommodation management processing and the general management processing, and the other functions are omitted.

The management information storage unit 13 has a device management DB 131, a scenario DB 132, and a template DB 133. The device management DB 131 stores information on the resource state of each communication device 20 and the accommodation position of each user.

The scenario DB 132 stores scenarios prepared according to the configuration contents and other control instruction contents in advance. For example, the scenarios corresponding to the configuration content includes are prepared in accordance with the type of communication service, the number of users, the communication amount, or the like indicated by the configuration input requests.

The template DB 133 stores a template file for creating a template to be used when the device control unit 150 controls the communication device 20. Here, the template includes various parameters. The parameter included in the template is an item variable for each user, and for example, an address, an identifier of the user, a communication band, a charge, and the like are used. In addition, the command template file may be different depending on any of the opening, change, or cancellation of the service, and may be different depending on each organization to which the user belongs.

The external system linkage unit 11 performs processing for causing the external system 60 and the management device 10 to be linked with each other. For example, the external system linkage unit 11 causes the management device 10 to perform the accommodation management processing and the general control processing according to information received from the external system 60.

Next, a case of linkage with the resource collection system 61 will be described. The external system linkage unit 11 receives the resource information of each communication device 20 collected by the resource collection system 61. Then, the external system linkage unit 11 executes a validation check for confirming whether or not the data conforms to the standard of the data processed by the management device 10 with respect to the received resource information and the like. After the validation check, the external system linkage unit 11 outputs the resource information to the resource collection unit 12. Thereafter, the external system linkage unit 11 receives input of update information of the resource from the resource collection unit 12. Then, the external system linkage unit 11 transmits update information of the resource to the resource collection system 61.

Next, the case of cooperation with the external system 60 other than the resource collection system 61 will be described. As one example of linkage with the external system 60, the external system linkage unit 11 receives the scenario start instruction from the monitor system 62. The scenario designated by the external system 60 includes a scenario for performing the recombination of the accommodation device and the blocking processing of communication and the like. The external system linkage unit 11 performs the validation check to the start instruction of the received scenario. The validation check includes authentication of the linking external system 60, confirmation of whether the received data conforms to the standard of the data processed by the management device 10, authentication of the instruction content, and the like. By the validation check, the external system linkage unit 11 can secure consistency and safety of processing executed by the management device 10 when performing linkage with the external system 60.

After the validation check, the external system linkage unit 11 outputs the scenario start instruction to the control processing unit 141. Thereafter, the external system linkage unit 11 receives an input of the execution result of the scenario from the control processing unit 141. Then, the external system linkage unit 11 outputs the execution result of the scenario to the monitor system 62. For example, by receiving the start instruction of the scenario from the monitor system 62, the management device 10 can set the communication device 20 by using an appropriate accommodation position and a setting of the communication equipment determined by the external device from information other than a current resource state such as contents of user communication and an integrated value of past communication traffic.

As another example of linkage with the external system 60, the external system linkage unit 11 receives the instruction of control content for controlling the communication device 20 from the monitor system 62. Then, the external system linkage unit 11 performs the validation check on the instruction of the received control content. After the validation check, the external system linkage unit 11 performs scenario conversion on the instructed control content to create the scenario for executing the instructed control content. Thereafter, the external system linkage unit 11 arranges the created scenario in the scenario DB 132. Next, the external system linkage unit 11 outputs the instruction of the control content to the control processing unit 141. Thereafter, the external system linkage unit 11 receives the input of the execution result of the instructed control content from the control processing unit 141. Then, the external system linkage unit 11 outputs the execution result of the instructed control content to the monitor system 62.

In addition to processing the control content transmitted from the monitor system 62, the external system linkage unit 11 can acquire external information from the external DB 63. For example, the external system linkage unit 11 receives an information acquisition request from the control processing unit 141 of the device management unit 14, and acquires external information from the external DB 63. Then, the external system linkage unit 11 outputs the acquired external information to the control processing unit 141.

The resource collection unit 12 periodically transmits an acquisition request of the resource information to each communication device 20 as shown in processing P1 in FIG. 2. The resource collection unit 12 receives and collects the resource information of each communication device 20 from each communication device 20 as a response to the acquisition request of the resource information. Here, the resource collection unit 12 can change logic of collection and monitoring of information on resources according to an operation state. For example, if the number of users varies little, the resource collection unit 12 can perform a change such as lengthening an interval for requesting acquisition of information on resources. In this case, the resource collection unit 12 can operate in conjunction with the traffic monitor system of the communication device 20 included in the external system 30 to change the logic.

Also, the resource collection unit 12 receives the input of the information of the resource transmitted from the resource collection system 161 from the external system linkage unit 11 as shown in the processing P2 of FIG. 2. Thus, the resource collection unit 12 can cope with the constant monitoring of the resources and the real-time collection of the information of the resources.

Next, as shown in processing P3 in FIG. 2, the resource collection unit 12 stores the acquired resource information in the device management DB 131, and updates the resource information of each communication device 20 held by the device management DB 131. Thereafter, the resource collection unit 12 receives the input of the update result from the device management DB 131. Next, the resource collection unit 12 outputs the update result of the information of the resources to the external system linkage unit 11.

Then, the resource collection unit 12 confirms the state of the resources of each communication device 20 at that time and determines whether a large change has occurred or not. For example, the resource collection unit 12 determines that the large change has occurred in the resource state of a specific communication device 20 depending on whether or not a communication traffic of the specific communication device 20 exceeds a predetermined threshold. In addition, the resource collection unit 12 holds the threshold for each resource including the surplus band of each communication device 20, the number of filters at that time, the number of sessions, and the like, and can determine that the large change has occurred in the state of the resource depending on whether or not each resource has reached the threshold. When it is determined that the large change has occurred, the resource collection unit 12 outputs resource change information indicating the change in the resource to the accommodation management unit 142.

As shown in FIG. 3, the device management unit 14 includes the control processing unit 141 and the accommodation management unit 142. The control processing unit 141 executes the general control processing, and the accommodation management unit 142 executes the accommodation management processing. The operation of each of the control processing unit 141 and the accommodation management unit 142 will be described in detail below.

The accommodation management unit 142 periodically monitors the configuration input request management DB 202. When confirming that the configuration input request is registered, the accommodation management unit 142 acquires the request content of the configuration input request. The accommodation management unit 142 selects and acquires the scenario corresponding to the request content from the scenario DB 132.

Next, the accommodation management unit 142 acquires the state of resources of each communication device 20 from the device management DB 131. Then, the accommodation management unit 142, on the basis of the request content and the free state of resources of the plurality of communication devices 20, determines the communication device 20 for executing the configuration input from among the plurality of communication devices 20. Thereafter, the accommodation management unit 142 stores information for identifying the communication device 20 determined as the configuration input destination in the configuration input request management DB 17 in association with the request content.

At this time, the accommodation management unit 142 may create a backup of the inputted user configuration. In this case, the accommodation management unit 142 determines the communication device 20 to be the backup destination of the user configuration. Thereafter, the accommodation management unit 142 stores information for identifying the communication device 20 determined as a storage destination of backup of the user configuration in the configuration input request management DB 17 in association with the backup creation instruction of the user configuration.

The accommodation management unit 142 receives the input of resource change information from the resource collection unit 12. Next, the accommodation management unit 142 determines whether or not to recombine the accommodation devices from the acquired resource change information. When the accommodation device is not recombined, the accommodation management unit 142 terminates the recombination processing of the accommodation device according to the change in the state of the resource.

On the other hand, in the case of recombining the accommodation devices, the accommodation management unit 142 determines which recombination scenario is to be executed in order to recombine the determined accommodation positions. Thereafter, the accommodation management device 142 selects and acquires the determined recombination scenario from the scenario DB 132. Next, the accommodation management unit 142 acquires the state of resources of each communication device 20 from the device management DB 131.

Then, the accommodation management unit 142 determines the communication device 20 to which the accommodation devices are to be recombined according to the scenario. For example, the accommodation management unit 142 determines whether or not each of the communication devices 20 satisfies the predetermined restriction condition on the basis of the acquired resource state of each communication device 20. For example, the restriction condition is a condition that, when all users having a specific communication device 20 as an accommodation device are accommodated in the specific communication device 20, the amount of any resource consumed by the specific communication device 20 does not exceed a predetermined amount of resource. In this case, the accommodation management unit 142 determines to execute recombination of accommodation devices for moving the user from the communication device 20 that does not satisfy the restriction condition.

Next, the accommodation management unit 142, according to the scenario, determines the user who performs the recombination of the accommodation destination and a new accommodation device of the user on the basis of the resource state of the communication device 20 that does not satisfy the restriction condition and the vacant state of the resource of the other communication device 20. Thereafter, the accommodation management unit 142 determines the input of the user configuration for executing the recombination of the accommodation device from the communication device 20 which does not satisfy the restriction condition to the communication device 20 determined as the accommodation device. In this case, the communication device 20 which does not satisfy the restriction condition becomes an object of the input of the user configuration for deleting the user, and the communication device 20 which becomes a new accommodation destination becomes an object of the input of the user configuration for accommodating the moved user.

Then, the accommodation management unit 142 stores information for identifying the communication device 20 which does not satisfy the restriction condition and the communication device 20 determined as the accommodation device in the configuration input request management DB 17 in association with the request content of the configuration input for recombination of the accommodation device. Also in this case, the accommodation management unit 142 can create the backup of the user configuration inputted by the recombination of the accommodation device.

The control processing unit 141 receives the input of the scenario start instruction from the external system linkage unit 11. For example, as shown in processing P5 in FIG. 2, the control processing unit 141 receives the scenario start instruction transmitted from the monitor system 62 via the external system linkage unit 11. Next, the control processing unit 141 confirms the content of the scenario whose start is instructed. Further, the control processing unit 141 performs integrated control such as arbitration of the start instruction of each scenario and determination of the start order of the scenario when receiving the start instruction of the plurality of scenarios.

The control processing unit 141 selects and acquires the scenario corresponding to the designated content from the scenario DB 132. Thereafter, the control processing unit 141 outputs the instruction of control according to the acquired scenario to the communication device 20 designated by the start instruction of the scenario to the device control unit 150 to which the designated communication device 20 is allocated. Thereafter, the control processing unit 141 outputs the execution result of the scenario to the external system linkage unit 11.

The control processing unit 141 receives the input of the instruction of control contents to the communication device 20 designated by the external system 60 from the external system linkage unit 11. For example, as shown in processing P5 in FIG. 2, the control processing unit 141 receives the instruction of the control content transmitted from the monitor system 62 via the external system linkage unit 11. Next, the control processing unit 141 confirms the instructed control contents. Also in this case, when receiving instructions of a plurality of control contents, the control processing unit 141 performs integrated control such as arbitration of each control and determination of the execution order of the control.

The control processing unit 141 outputs the instruction of control according to the instructed control content to the communication device 20 designated from the external system 60 to the device control unit 150 to which the specific communication device 20 is allocated. Thereafter, the control processing unit 141 outputs the execution result of the scenario to the external system linkage unit 11.

Further, as shown in processing P6 in FIG. 2, the control processing unit 141 transmits the acquisition request of external information to the external system linkage unit 11 to acquire the external information stored in the external DB 63. The control processing unit 141 previously stores the communication device 20 selected according to the acquired external information and control to be executed. Then, the control processing unit 141 determines the communication device 20 for executing control and the content of the control to be executed by using the acquired external information. Thereafter, the control processing unit 141 outputs the execution instruction of control of the determined content to the determined communication device 20 to the device control unit 150 to which the communication device 20 is allocated.

At least one of the plurality of communication devices 20 is allocated to the device control unit 150. For example, in FIG. 2, the communication devices 21 to 23 are assigned to the device control unit 151, the communication devices 24 to 26 are assigned to the device control unit 152, and the communication devices 27 to 29 are assigned to the device control unit 153.

The device control unit 150 executes the configuration input based on the request content to the communication device 20 identified by the identification information associated with the request content. Thus, communication between the communication device 20 and the user is established. For example, the device control unit 150 periodically monitors the configuration input request management DB 17, and acquires the request contents associated with the identification information of the allocated communication device 20. Next, the device control unit 150 selects and acquires the template related to the user configuration from the template DB 133. Then, the device control unit 150 replaces the parameters included in the template on the basis of the request content and the identification information to create a command list. Then, the device control unit 150 executes the created command and sets the user configuration to the communication device 20.

The device control unit 150 receives the input of the control instruction according to the acquired scenario to the communication device 20 designated by the start instruction of the scenario from the control processing unit 141. Then, the device control unit 150 executes control according to the scenario to the designated communication device 20. The device control unit 150 receives the input of the control instruction according to the instructed control content to the communication device 20 designated by the external system 60 from the control processing unit 141. Then, the device control unit 150 executes control to the designated communication device 20 according to the instruction. For example, the device control unit 150 controls the communication device 20 so as to block communication in the designated communication device 20.

Processing of First Embodiment

Figure 4:
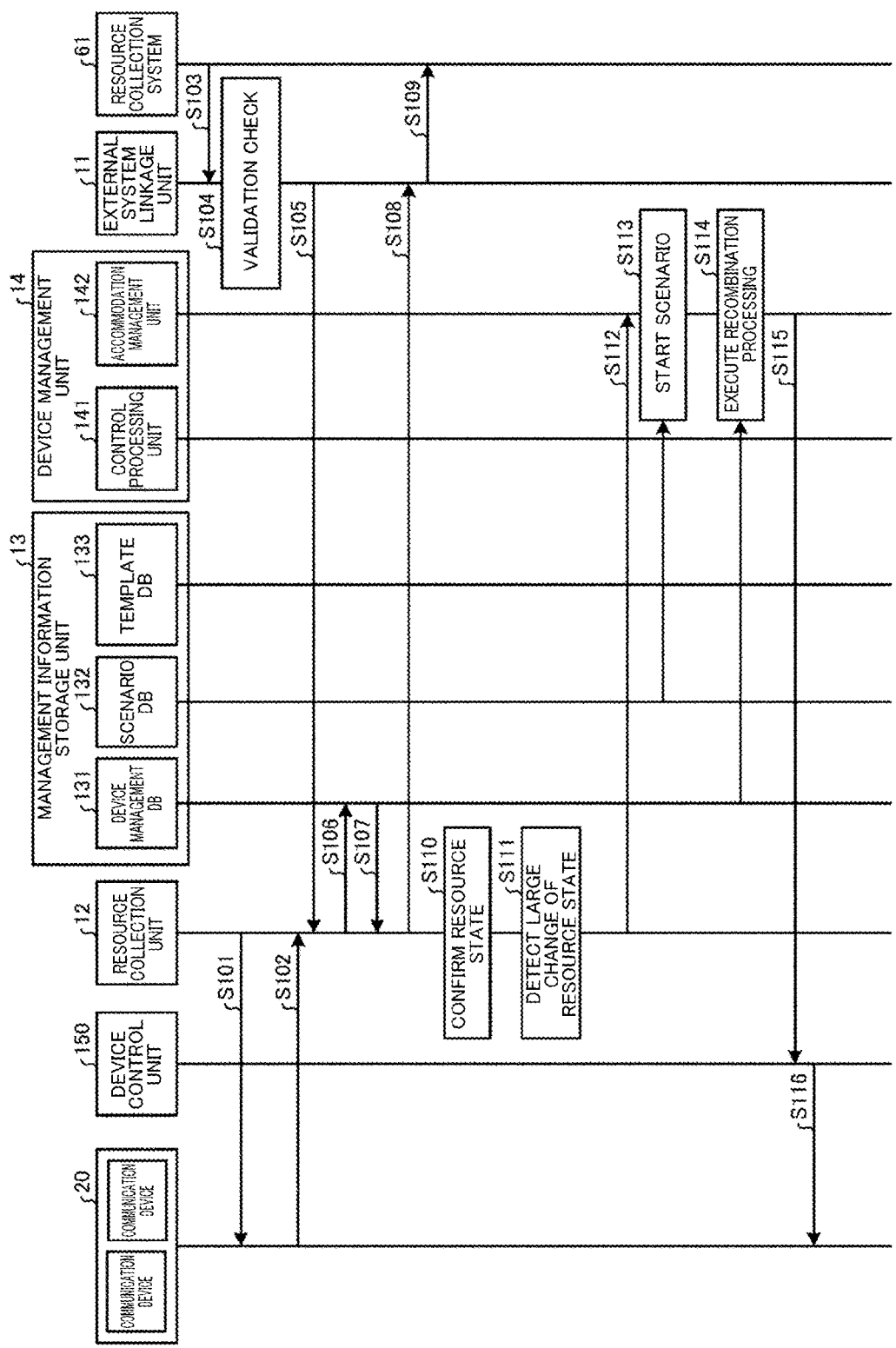
FIG. 4 is a sequence diagram showing the flow of the recombination processing of the accommodation device in the management system according to the embodiment.

Next, the processing flow of the recombination of the accommodation device by the management system 1 according to this embodiment is described with reference to FIG. 4. FIG. 4 is the sequence diagram showing the processing flow of the recombination of the accommodation device by the management system according to this embodiment.

The resource collection unit 12 transmits the acquisition request of resource information to the communication device 20 according to a predetermined logic (step S101).

Thereafter, the resource collection unit 12 collects resource information of each communication device 20 transmitted as a response to the acquisition request of the resource information (step S102).

The external system linkage unit 11 receives information on resources of each communication device 20 to be monitored at all times from the resource collection system 61 (step S103).

Next, the external system linkage unit 11 executes the validation check on the received information of the resource (step S104).

Next, the external system linkage unit 11 outputs the received information of the resource to the resource collection unit 12 (step S105). In FIG. 4, although the resource collection unit 12 has been described so as to continuously acquire the information of the resources from each communication device 20 by the own device and the information of the resources collected by the resource collection system 61, the resource collection unit 12 independently performs them in reality.

The resource collection unit 12 registers the acquired resource information in the device management DB 131, and updates the resource information of the communication device 20 held by the device management DB 131 (step S106).

Thereafter, the resource collection unit 12 receives the input of notification of update completion of information on the resource from the device management DB 131 (step S107).

Next, the resource collection unit 12 checks the state of the resource of each communication device 20 (step S110).

Then, the resource collection unit 12 detects that a large change has occurred in the state of the resource in each communication device 20 on the basis of the state of the resource of each communication device 20 (step S111).

The resource collection unit 12 outputs resource change information indicating a change in the resource to the accommodation management unit 142 of the device management unit 14 (step S112).

The accommodation management unit 142 receives the input of resource change information from the resource collection unit 12. Then, the accommodation management unit 142 determines whether or not to recombine the accommodation devices from the acquired resource change information. Here, the description will be given of the case where the accommodation position is recombined. When it is determined to recombine the accommodation positions, the accommodation management unit 142 determines which recombination scenario is to be executed in order to recombine the determined accommodation positions. Thereafter, the accommodation management unit 142 selects the determined recombination scenario from scenarios held by the scenario DB 132 and starts the selected recombination scenario (step S113).

Then, the accommodation management unit 142 executes the recombination processing according to the started scenario (step S114). Specifically, the accommodation management unit 142 determines a user who performs the recombination of the accommodation devices and a new accommodation device of the user by using information on resources stored in the device management DB 131, restriction conditions of each communication device 20, and the like. Thereafter, the accommodation management unit 142 determines the input of the configuration for executing the recombination of the accommodation device from the communication device 20 which does not satisfy the restriction condition to the communication device 20 determined as the accommodation device.

Then, the accommodation management unit 142 stores information for identifying the communication device 20 which does not satisfy the restriction condition and the communication device 20 determined as the accommodation device in the configuration input request management DB 17 in association with the request content. Thus, the accommodation management unit 142 instructs the device control unit 150 to control the communication device 20 of the recombination processing of the accommodation device according to the scenario (step S115).

The device control unit 150 monitors the configuration input request management DB 17 to acquire the configuration input request. Thereafter, the device control unit 150 performs the input of the configuration to the communication device 20 according to the configuration input request (step S116). Thus, the device control unit 150 executes the recombination processing of the accommodation device.

Figure 5:
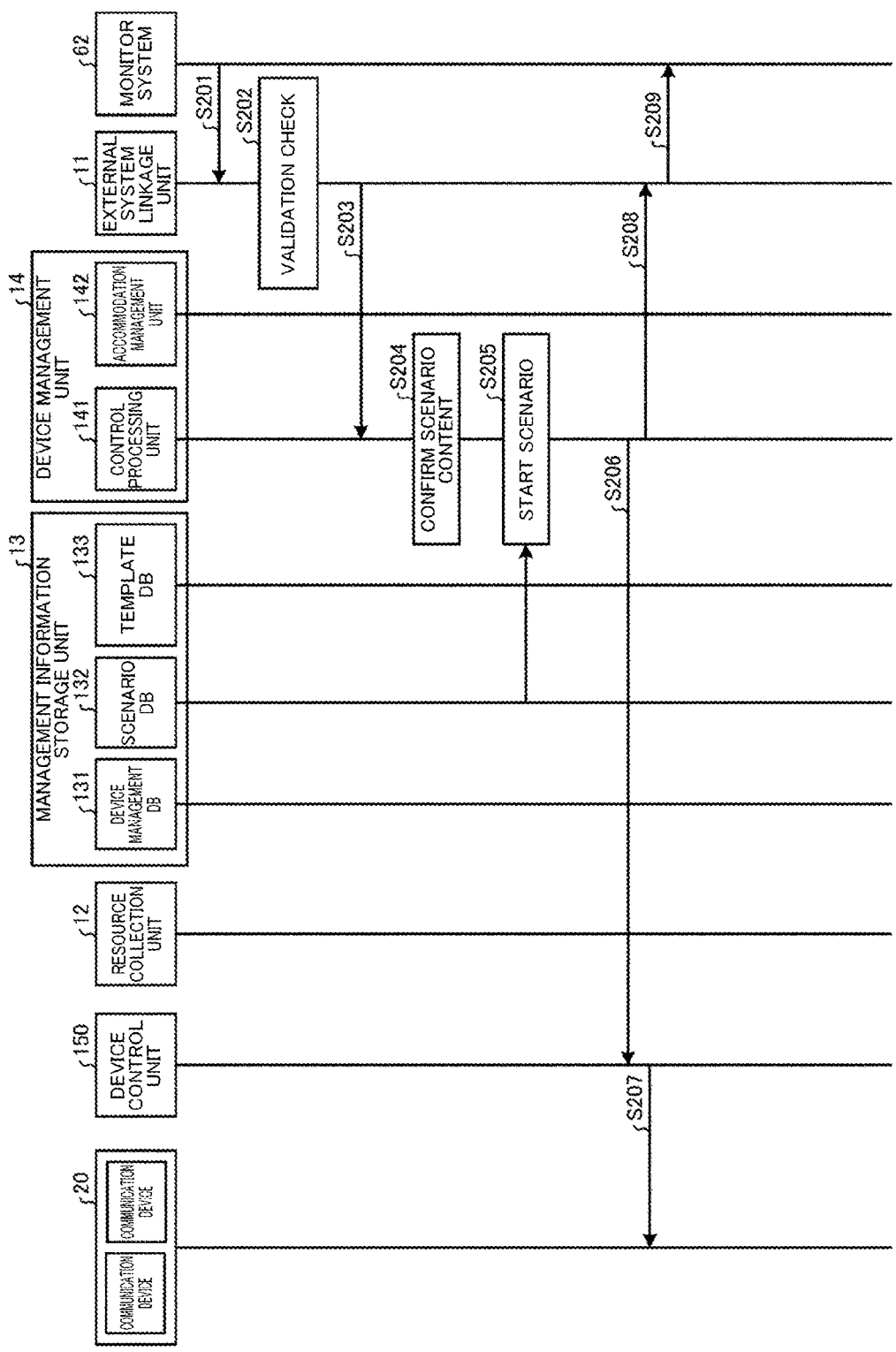
FIG. 5 is a sequence diagram showing a flow of control of the communication device by the management system when receiving a scenario start instruction from a monitor system.

Next, referring to FIG. 5, the flow of control of the communication device 20 by the management system 1 according to the present embodiment when the start instruction of the scenario is received from the external system 60 will be described. FIG. 5 is the sequence diagram showing the flow of control of the communication device by the management system when the start instruction of the scenario is received from the monitor system. Here, the description will be given of the case where the monitor system 62 of the external system 60 instructs the start of the scenario.

The external system linkage unit 11 receives the start instruction of the scenario from the monitor system 62 (step S201).

Next, the external system linkage unit 11 executes the validation check for the start instruction of the scenario (step S202).

After the validation check, the external system linkage unit 11 outputs the start instruction of the scenario to the control processing unit 141 of the device management unit 14 (step S203).

The control processing unit 141 receives the start instruction of the scenario from the external system linkage unit 11. Then, the control processing unit 141 confirms the content of the scenario whose start is instructed (step S204).

Next, the control processing unit 141 selects and acquires the scenario corresponding to the confirmed content from the scenario DB 132, and starts the scenario (step S205).

Thereafter, the control processing unit 141 instructs the device control unit 150 to control the communication device 20 according to the started scenario (step S206).

The device control unit 150 receives the instruction from the control processing unit 141 and controls the communication device 20 according to the scenario (step S207).

The control processing unit 141 outputs the execution result of the scenario to the external system linkage unit 11 (step S208).

The external system linkage unit 11 transmits the execution result of the scenario acquired from the control processing unit 141 to the monitor system 62 which is a transmission source of the start instruction of the scenario (step S209).

Figure 6:
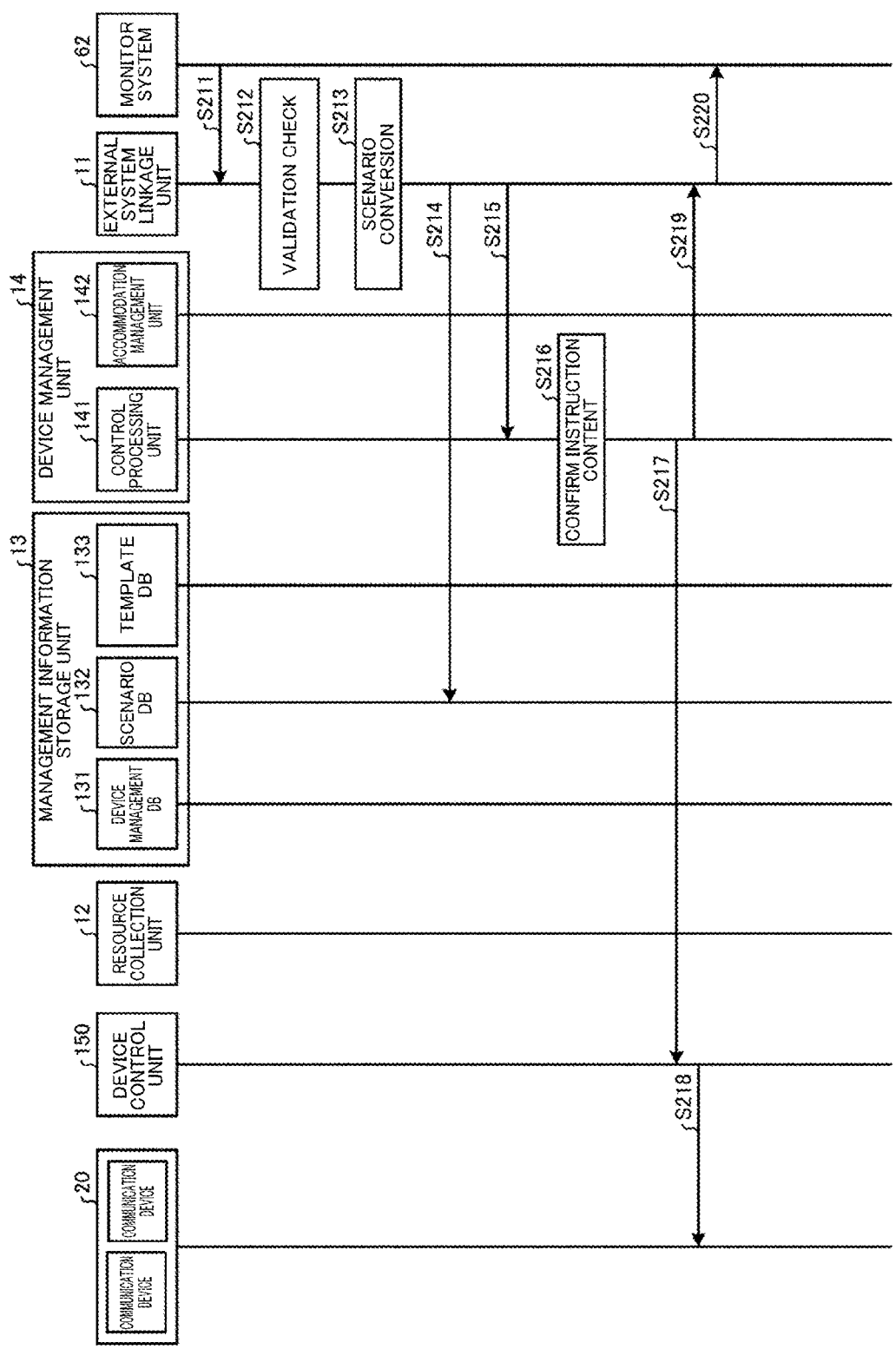
FIG. 6 is a sequence diagram showing a flow of control of the communication device by the management system when receiving the scenario start instruction from an external system.

Next, referring to FIG. 6, the flow of control of the communication device 20 by the management system 1 according to the present embodiment when the control instruction of the communication device 20 is received from the external system 60 will be described. FIG. 6 is the sequence diagram showing the flow of control of the communication device by the management system when the start instruction of the scenario is received from the external system. Here, the case where the monitor system 62 of the external system 60 issues the control instruction will be described.

The external system linkage unit 11 receives the instruction of control contents for controlling the communication device 20 from the monitor system 62 (step S211).

Next, the external system linkage unit 11 executes the validation check to the instruction of the received control content (S212).

After the validation check, the external system linkage unit 11 performs scenario conversion of the control content to create the scenario corresponding to the instructed control content (step S213).

Thereafter, the external system linkage unit 11 arranges the created scenario in the scenario DB 132 (step S214).

Next, the external system linkage unit 11 outputs the instruction of the control content to the control processing unit 141 of the device management unit 14 (step S215).

The control processing unit 141 receives the input of the instruction of control contents from the external system linkage unit 11. Next, the control processing unit 141 confirms the indicated content by the instruction of the control content (step S216).

Next, the control processing unit 141 instructs the device control unit 150 to control the communication device 20 according to the instructed control content (step S217).

The device control unit 150 receives the instruction from the control processing unit 141, and controls the communication device 20 according to the instructed control content (step S218).

The control processing unit 141 outputs the execution result of the control performed according to the instruction of the control content to the external system linkage unit 11 (step S219).

The external system linkage unit 11 transmits the execution result acquired from the control processing unit 141 to the monitor system 62 which is the transmission source of the instruction of control content (step S220).

Figure 7:
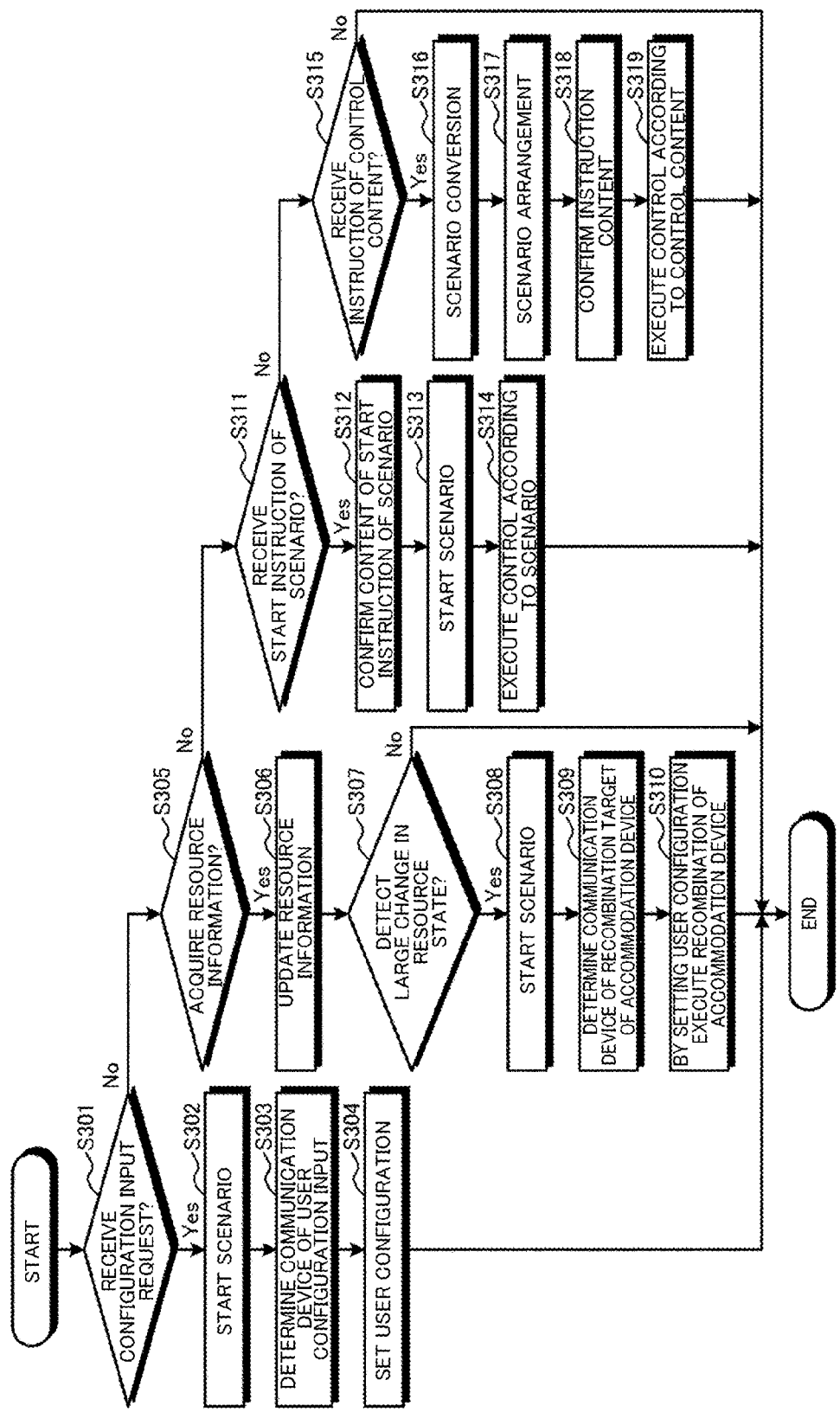
FIG. 7 is a flowchart showing control of the communication device of the management system according to an example.

Referring to FIG. 7, the control flow of the communication device 20 by the management system 1 according to the present example will be described collectively. FIG. 7 is the flowchart of the control of the communication device by the management system according to the example.

The accommodation management unit 142 monitors the configuration input request management DB 17, and determines whether or not the configuration input request is stored in the configuration input request management DB 17 (step S301).

When the configuration input request is stored (step S301: Yes), the accommodation management unit 142 acquires the configuration input request from the configuration input request management DB 17. Then, the accommodation management unit 142 acquires the scenario corresponding to the acquired configuration input request from the scenario DB 132, and starts the acquired scenario (step S302).

Then, the accommodation management unit 142 executes processing according to the scenario, and determines the communication device 20 to which the user configuration is to be inputted (step S303). Then, the accommodation management unit 142 stores information for identifying the communication device 20 determined as the configuration input destination in the configuration input request management DB 17 in association with the request content.

When the information for identifying the communication device 20 determined as the configuration input destination is stored in the configuration input request management DB 17 in association with the request content, the device control unit 150 to which the communication device 20 determined as the configuration input destination is allocated acquires the configuration input request. Then, the device control unit 150 sets the user configuration to the communication device 20 determined as the configuration input destination according to the configuration input request (step S304).

On the other hand, when the configuration input request is not stored (step S301: No), the resource collection unit 12 determines whether or not the resource information is acquired by the acquisition request from the own device or transmission from the external system 60 (step S305).

When the information of the resource is acquired (step S305: Yes), the resource collection unit 12 stores the acquired information of the resource in the device management DB 131 and updates the information of the resource of the communication device 20 (step S306).

Next, the resource collection unit 12 determines whether or not the occurrence of a large change in the resource state of each communication device 20 is detected (step S307).

When there is no large change in the state of the resource (step S307: No), the resource collection unit 12 ends the control processing.

On the other hand, when a large change occurs in the state of the resource (step S307: Yes), the resource collection unit 12 outputs the resource change information to the accommodation management unit 142. The accommodation management unit 142 acquires the resource change information from the resource collection unit 12. Then, the accommodation management unit 142 determines which scenario is to be executed on the basis of the resource change information. Thereafter, the accommodation management unit 142 acquires the determined scenario from the scenario DB 132, and starts the acquired scenario (step S308).

Then, the accommodation management unit 142 executes processing according to the scenario, and determines the communication device 20 to be a target of recombination of the accommodation device (step S309). Thereafter, the accommodation management unit 142 stores information for identifying the communication device 20 determined as the target of recombination of the accommodation device in the configuration input request management DB 17 in association with the input request for recombination of the accommodation device.

When the information for identifying the communication device 20 is stored in the configuration input request management DB 17 in association with the input request for recombination of the accommodation device, the device control unit 150 to which the communication device 20 determined as the configuration input destination is allocated acquires the configuration input request. Then, the device control unit 150 sets the user configuration to the communication device 20 determined as the configuration input destination according to the configuration input request (step S310).

On the other hand, when the information of the resource is not acquired (step S305: No), the external system linkage unit 11 determines whether or not the start instruction of the scenario is received from the external system 60 (step S311).

When the start instruction of the scenario is received from the external system 60 (step S311: Yes), the external system linkage unit 11 outputs the start instruction of the scenario to the control processing unit 141. The control processing unit 141 checks the content of the start instruction of the scenario acquired from the external system linkage unit 11 (step S312).

Next, the control processing unit 141 acquires the scenario from the scenario DB 132 and starts it according to the start instruction of the scenario (step S313).

Thereafter, the control processing unit 141 executes control of the communication device 20 according to the started scenario (step S314).

On the other hand, when the start instruction of the scenario is not received from the external system 60 (step S311:No), the external system linkage unit 11 determines whether or not the instruction of control content for controlling the communication device 20 has been received from the external system 60 (step S315). When the instruction of control contents for controlling the communication device 20 is not received (step S315: No), the external system linkage unit 11 ends the control processing of the communication device 20.

On the other hand, when the instruction of control contents for controlling the communication device 20 is received (step S315: Yes), the external system linkage unit 11 performs scenario conversion on the control contents and creates the scenario corresponding to the control contents (step S316).

Thereafter, the external system linkage unit 11 arranges the created scenario in the scenario DB 132 (step S317).

Next, the external system linkage unit 11 outputs the instruction of control contents for controlling the communication device 20 to the control processing unit 141. The control processing unit 141 checks the contents of the instruction for controlling the communication device 20 (step S318).

Next, the control processing unit 141 executes control of the communication device 20 according to the control contents (step S319).

The management device 10 repeats the processing described in the flowchart of FIG. 7 to proceed the control of the communication device 20.

Effects of Embodiment

As described above, the management device 10 includes the resource collection unit 12 and the device management unit 14 separately from the resource collection unit 12. Then, the resource collection unit 12 collects the information on resources and confirms the resource states. The device management unit 14 recombine the accommodation devices when the resource collection unit 12 detects a large change in the state of the resource in each communication device 20. By dividing the resource collection unit 12 and the device management unit 14 in this way, necessary performance can be easily secured in each of the functions of collecting the information of resources and confirming the resource states and the function of controlling the recombination of the accommodation device.

Further, the management device 10 includes the external system linkage unit 11. The external system linkage unit 11 makes the external system 60 such as the resource collection system 61 for always monitoring the communication device 20 and collecting information on resources, a monitor system 62 for monitoring the state of the communication device 20 other than the information on resources, and an external DB 63 cooperate with the management device 10. Thus, the resource collection unit 12 can detect the change in the state of the resource by using the information of the resource obtained by the resource collection system 61. Therefore, the resource collection unit 12 can achieve the control of the communication device 20 in real time even if the resource collection unit 12 does not have performance of monitoring at all times.

The device management unit 14 can control the communication device 20 on the basis of the start instruction of the scenario inputted from the external system 60 and the instruction of control contents. Thus, the accommodation position and communication control of the user can be changed from information other than the resource information, such as QoS control by the integrated value of the communication traffic of the user, detection of virus communication as a security service and automatic blocking of communication, and the like. In this way, control such as recombination and setting change of the accommodation device can be executed also from the external system, so that the management system 1 can link with a system for collecting and monitoring various resource information, thus, more various services can be provided. That is, the management device 10 can control the communication device 20 on the basis of information other than the current resource state. For example, the external system 60 checks communication contents in the communication device 20 and identifies communication due to virus infection and an attack packet, so that the management device 10 can perform control such as automatic blocking of communication of the corresponding communication device 20 by using the information from the external system 60.

[System Configuration or the Like]

In addition, the components of each of the illustrated devices are functional concepts and may not be configured as physical components, as illustrated. That is, specific forms of the distribution and integration of the devices are not limited to the illustrated forms. All or some of the forms of the distribution and integration of the devices can be distributed or integrated functionally or physically in any unit in accordance with various loads, usage situations, or the like. Further, all or arbitrary some of the processing functions performed by the devices may be implemented by a central processing unit (CPU) and a program analyzed and executed by the CPU, or may be implemented as hardware by wired logic.

Of the processing described in the present embodiment, all or some of the types of processing described as the automatically performed processing can also be performed manually, or all or some of the types of processing described as the manually performed processing can be performed automatically in accordance with a known method. Besides, information including the processing orders, the control orders, the specific names, and the various kinds of data and parameters described in the disclosure or the drawings can be arbitrarily changed unless otherwise mentioned.

[Program]

In one embodiment, the management system 1 can be implemented by installing a management program for executing the above-mentioned management processing as packaged software or online software on a desired computer. For example, by executing the above-mentioned management program by an information processing device, the information processing device can function as the management system 1. The information processing device described here may include a desktop or laptop personal computer. Alternatively, the scope of the information processing devices further includes mobile communication terminals such as smart phone, mobile telephone, and personal handy-phone system (PHS), and slate terminals such as a personal digital assistant (PDA).

The management device 10 can be implemented as a management server device for providing a client, which is a terminal device used by a user, with service related to the above-mentioned management processing. For example, the management server device is implemented as a server device which receives the configuration input request and provides a management service for performing configuration input. In this case, the management server device may be implemented as a Web server, or may be implemented as a cloud for providing service related to the above-mentioned management processing by outsourcing.

Figure 8:
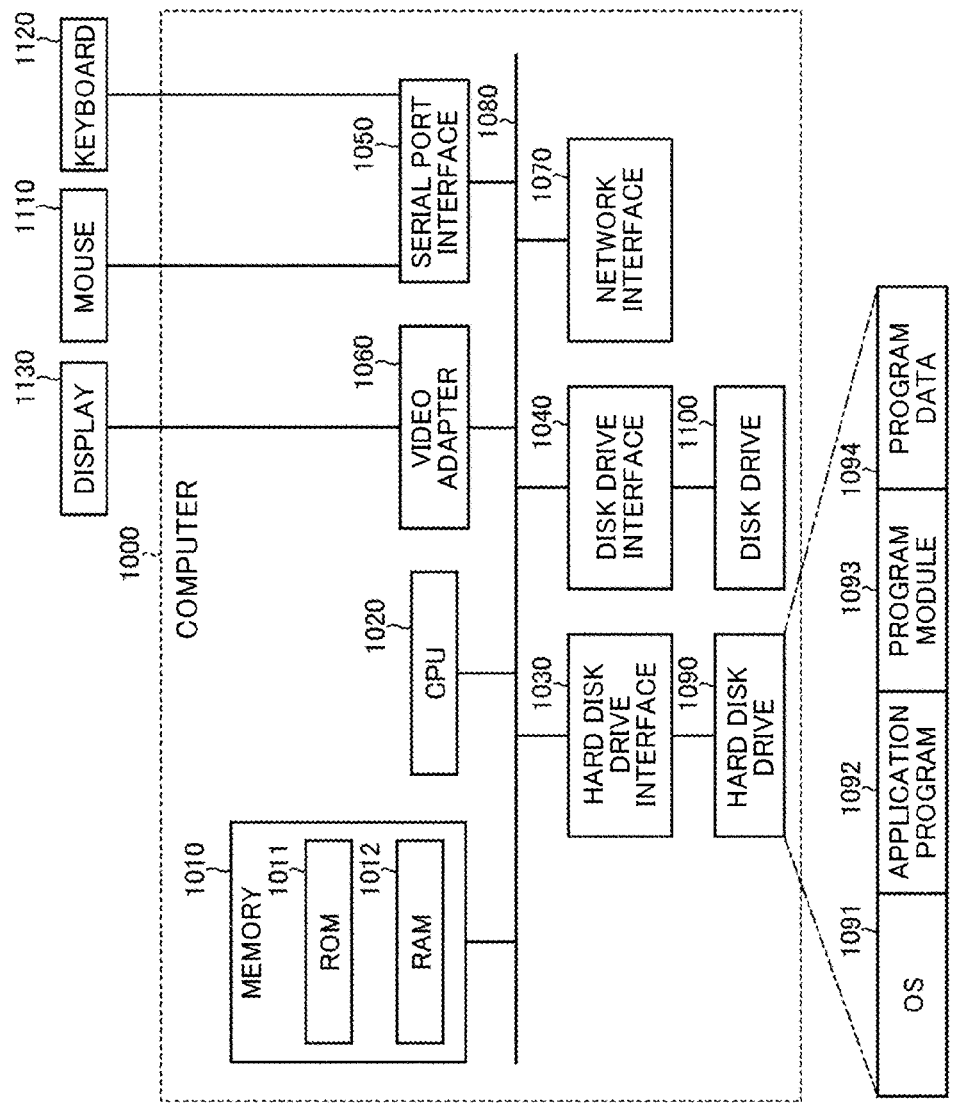
FIG. 8 is a diagram showing an example of a computer for executing a management program.

FIG. 8 is a diagram showing an example of a computer for executing the management program. A computer 1000 includes, for example, a memory 1010 and a CPU 1020. In addition, the computer 1000 has a hard disk drive interface 1030, a disk drive interface 1040, a serial port interface 1050, a video adapter 1060, and a network interface 1070. These units are connected by a bus 1080.

The memory 1010 includes a read-only memory (ROM) 1011 and a random access memory (RAM) 1012. The ROM 1011 stores a boot program such as a basic input output system (BIOS). The hard disk drive interface 1030 is connected to a hard disk drive 1090. The disk drive interface 1040 is connected to a disk drive 1100. For example, a removable storage medium such as a magnetic disk and an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. In other words, a program that defines each processing of the management device 10 which has the similar function with the management device 10 is implemented as the program module 1093 on which computer-executable codes are described. The program module 1093 is stored in, for example, the hard disk drive 1090. For example, the program module 1093 for performing the same processing as the functional structure of the management device 10 is stored in the hard disk drive 1090. Note that the hard disk drive 1090 may be replaced with a Solid State Drive (SSD).

Setting data that is used in the processing of the above-described embodiments is stored as the program data 1094 in, for example, the memory 1010 or the hard disk drive 1090. The CPU 1020 reads the program module 1093 and the program data 1094 stored in the memory 1010 or the hard disk drive 1090 to the RAM 1012 as necessary, and performs the processing of the foregoing embodiment.

The program module 1093 or the program data 1094 is not limited to being stored in the hard disk drive 1090, and may be stored, for example, in a detachable storage medium and read by the CPU 1020 via the disc drive 1100 or the like. Alternatively, the program module 1093 and the program data 1094 may be stored in another computer connected via a network (such as Local Area Network (LAN) and Wide Area Network (WAN)). The program module 1093 and the program data 1094 may be read from another computer via the network interface 1070 by the CPU 1020.

REFERENCE SIGNS LIST

1 Management system
10 Management device
20 to 29 Communication device
31, 32 Switch
41 to 43 User
11 External system linkage unit
12 Resource collection unit
13 Management information storage unit
14 Device management unit
16 Host system correspondence unit
17 Configuration input request management DB
18 Resource controller
50 Host system
60 External system
61 Resource collection system
62 Monitor system
63 External DB
131 Device management DB
132 Scenario DB
133 Template DB
141 Control processing unit
142 Accommodation management unit
150 to 153 Device control unit

The invention claimed is:

1. A management device, comprising:
an external system linkage unit, including one or more processors, configured to receive resource information of each of a plurality of communication devices accommodating users using a network from an external system, and perform a first validation check on the received resource information;

a resource collection unit, including one or more processors, configured to, in response to the external system linkage unit determining that the received resource information passes the first validation check, (i) acquire the resource information from the external system linkage unit, and (ii) detect a change in a resource state, wherein detecting the change in the resource state comprises:

determining each of resources comprising (i) a surplus band of each of the plurality of communication devices, (ii) a number of filters, and (iii) a number of sessions has reached a respective predefined threshold value; and determining that the change has been detected in the resource state in response to determining that each of the resources has reached the respective predefined threshold value; and a device management unit, including one or more processors, configured to, in response to the external system linkage unit determining that the received resource information passes the first validation check, execute control of the communication device including recombination of an accommodation position of the user on the basis of the change in the resource state detected by the resource collection unit.

2. The management device according to claim 1, wherein the external system includes a resource collection system that constantly monitors the communication device and acquires constantly monitored resource information, the external system linkage unit is configured to receive the constantly monitored resource information from the resource collection system, and the resource collection unit is configured to detect the change in the resource state on the basis of the constant monitoring resource information received by the external system linkage unit.

3. The management device according to claim 1, wherein the external system linkage unit is configured to receive a control instruction of the communication device from the external system, and perform a second validation check of the control instruction, and the device management unit is configured to, in response to the external system linkage unit determining that the received control instruction passes the second validation check, control the communication device on the basis of the control instruction received by the external system linkage unit.

4. The management device according to claim 1, wherein the device management unit has a plurality of scenarios indicating processing logic according to an acquired instruction, and is configured to select the scenario corresponding to the acquired instruction to recombine the accommodation position, determine the accommodation position to be an accommodation source and an accommodation destination according to the selected scenario, and perform the recombination of the accommodation position.

5. The management device according to claim 4, wherein the external system linkage unit is configured to receive a start instruction of the scenario from the external system, and the device management unit is configured to select the scenario designated by the start instruction, and control the communication device on the basis of the selected scenario.

6. A management method, comprising:

receiving resource information of each of a plurality of communication devices accommodating users using a network from an external system;

performing a first validation check on the received resource information; and in response to determining that the received resource information passes the first validation check, detecting a change in a resource state, and executing the control of the communication device including recombination of an accommodation position of the user on the basis of the change detected in the resource state, wherein detecting the change in the resource state comprises:

determining each of resources comprising (i) a surplus band of each of the plurality of communication devices, (ii) a number of filters, and (iii) a number of sessions has reached a respective predefined threshold value; and determining that the change has been detected in the resource state in response to determining that each of the resources has reached the respective predefined threshold value.

7. A non-transitory computer-readable storage medium storing management program that causes a computer to execute operations comprising:

receiving resource information of each of a plurality of communication devices accommodating users using a network from an external system;

performing a first validation check on the received resource information; and in response to determining that the received resource information passes the first validation check, detecting a change in a resource state, and executing the control of the communication device including recombination of an accommodation position of the user on the basis of the change detected in the resource state, wherein detecting the change in the resource state comprises:

determining each of resources comprising (i) a surplus band of each of the plurality of communication devices, (ii) a number of filters, and (iii) a number of sessions has reached a respective predefined threshold value; and determining that the change has been detected in the resource state in response to determining that each of the resources has reached the respective predefined threshold value.

8. The management method of claim 6, wherein:

the external system includes a resource collection system that constantly monitors the communication device and acquires constantly monitored resource information; and the management method further comprises:

receiving the constantly monitored resource information from the resource collection system, and detecting the change in the resource state on the basis of the constant monitoring resource information.

9. The management method of claim 6, further comprising:

receiving a control instruction of the communication device from the external system;

performing a second validation check of the control instruction; and in response to determining that the received control instruction passes the second validation check, controlling the communication device on the basis of the received control instruction.

10. The management method of claim 6, further comprising:
selecting, from a plurality of scenarios indicating processing logic according to an acquired instruction, a scenario corresponding to the acquired instruction to recombine the accommodation position;
determining the accommodation position to be an accommodation source and an accommodation destination according to the selected scenario; and
performing the recombination of the accommodation position.

11. The management method of claim 10, further comprising:
receiving a start instruction of the scenario from the external system;
selecting the scenario designated by the start instruction; and
controlling the communication device on the basis of the selected scenario.

12. The non-transitory computer-readable storage medium of claim 7, wherein:
the external system includes a resource collection system that constantly monitors the communication device and acquires constantly monitored resource information; and
the operations further comprise:
receiving the constantly monitored resource information from the resource collection system, and
detecting the change in the resource state on the basis of the constant monitoring resource information.

13. The non-transitory computer-readable storage medium of claim 7, wherein the operations further comprise:
receiving a control instruction of the communication device from the external system;
performing a second validation check of the control instruction; and
in response to determining that the received control instruction passes the second validation check, controlling the communication device on the basis of the received control instruction.

14. The non-transitory computer-readable storage medium of claim 7, wherein the operations further comprise:
selecting, from a plurality of scenarios indicating processing logic according to an acquired instruction, a scenario corresponding to the acquired instruction to recombine the accommodation position;
determining the accommodation position to be an accommodation source and an accommodation destination according to the selected scenario; and
performing the recombination of the accommodation position.

15. The non-transitory computer-readable storage medium of claim 14, wherein the operations further comprise:
receiving a start instruction of the scenario from the external system;
selecting the scenario designated by the start instruction; and
controlling the communication device on the basis of the selected scenario.

16. The management device according to claim 1, wherein performing the first validation check comprises:
determining whether data for the resource information conforms to a data standard.

17. The management device according to claim 3, wherein performing the second validation check comprises one or more of:
determining an authentication of the external system;
determining whether data for the control instruction conforms to a data standard; or
determining an authentication of a content of the control instruction.

* * * * *